United States Patent [19]

Kanoff

[11] 4,374,483

[45] Feb. 22, 1983

[54] IGNITION SYSTEM FOR AN ELECTRICAL CONNECTOR

[75] Inventor: George Kanoff, Elizabethtown, Pa.

[73] Assignee: AMP Incorporated, Harrisburg, Pa.

[21] Appl. No.: 248,763

[22] Filed: Mar. 30, 1981

[51] Int. Cl.³ .................... F42C 19/12; H02G 15/08
[52] U.S. Cl. ............................... 89/1 B; 102/202.14; 174/90; 339/276 E
[58] Field of Search ............ 174/84 R, 84 C, 79, 174/90, 87, 94 R; 339/276 E, 275 E; 89/1 B; 102/202.14

[56] References Cited

U.S. PATENT DOCUMENTS

| 3,345,454 | 10/1967 | Mixon | 174/90 X |
| 3,612,748 | 10/1971 | James | 339/276 E X |
| 3,761,602 | 9/1973 | DeSio et al. | 174/90 X |
| 3,826,860 | 7/1974 | DeSio et al. | 339/276 E X |
| 4,128,058 | 12/1978 | Mixon et al. | 89/1 B X |
| 4,252,992 | 2/1981 | Cherry et al. | 174/84 R |

*Primary Examiner*—David H. Brown
*Attorney, Agent, or Firm*—Allan B. Osborne

[57] ABSTRACT

The present invention is an improved ignition system for use with internally fired electrical connectors of the type used to splice heavy, high voltage electrical cable. More particularly, the invention consists of an ignitor assembly and a device for removing the electrical detonating wires from the connector after firing.

3 Claims, 5 Drawing Figures

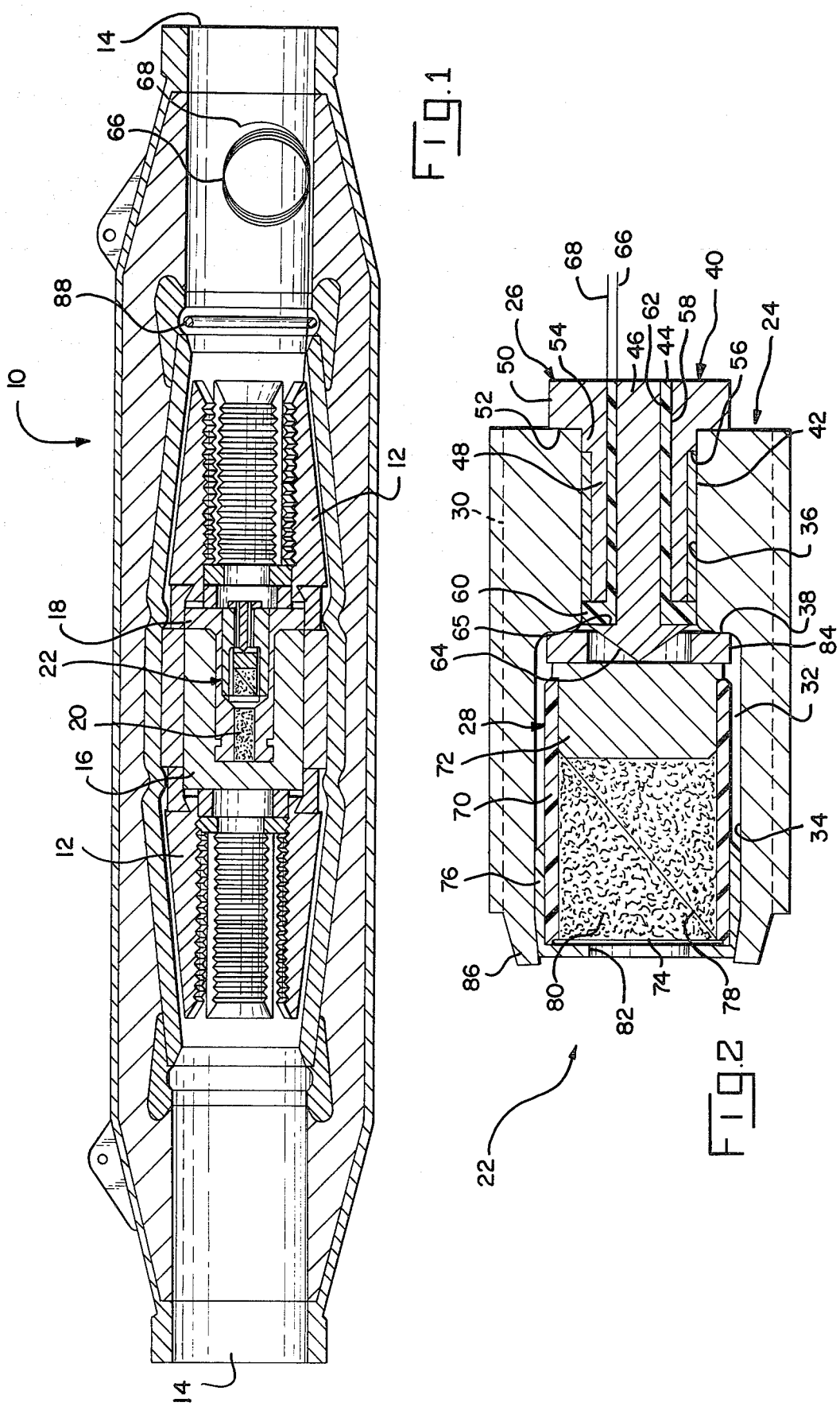

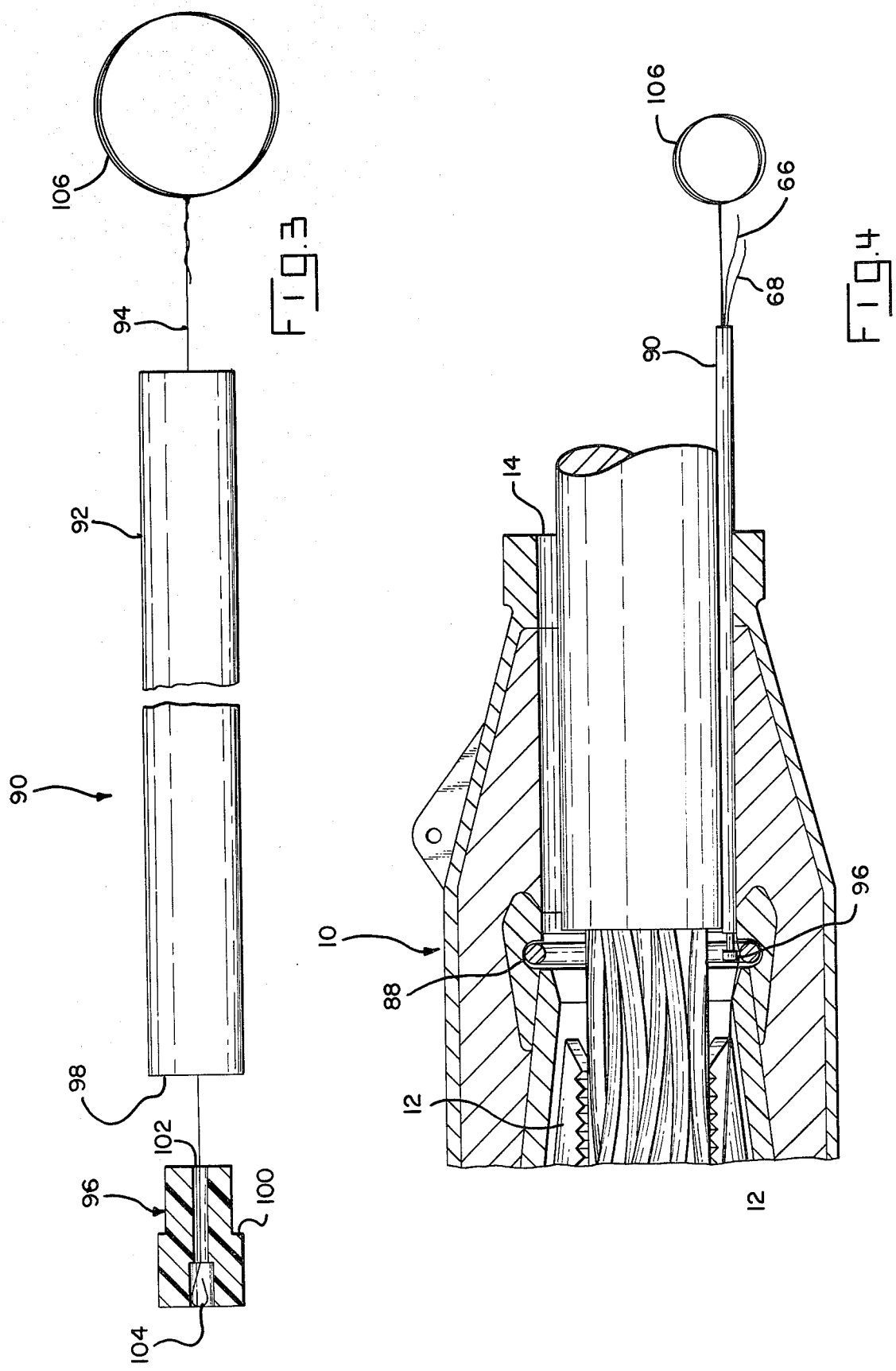

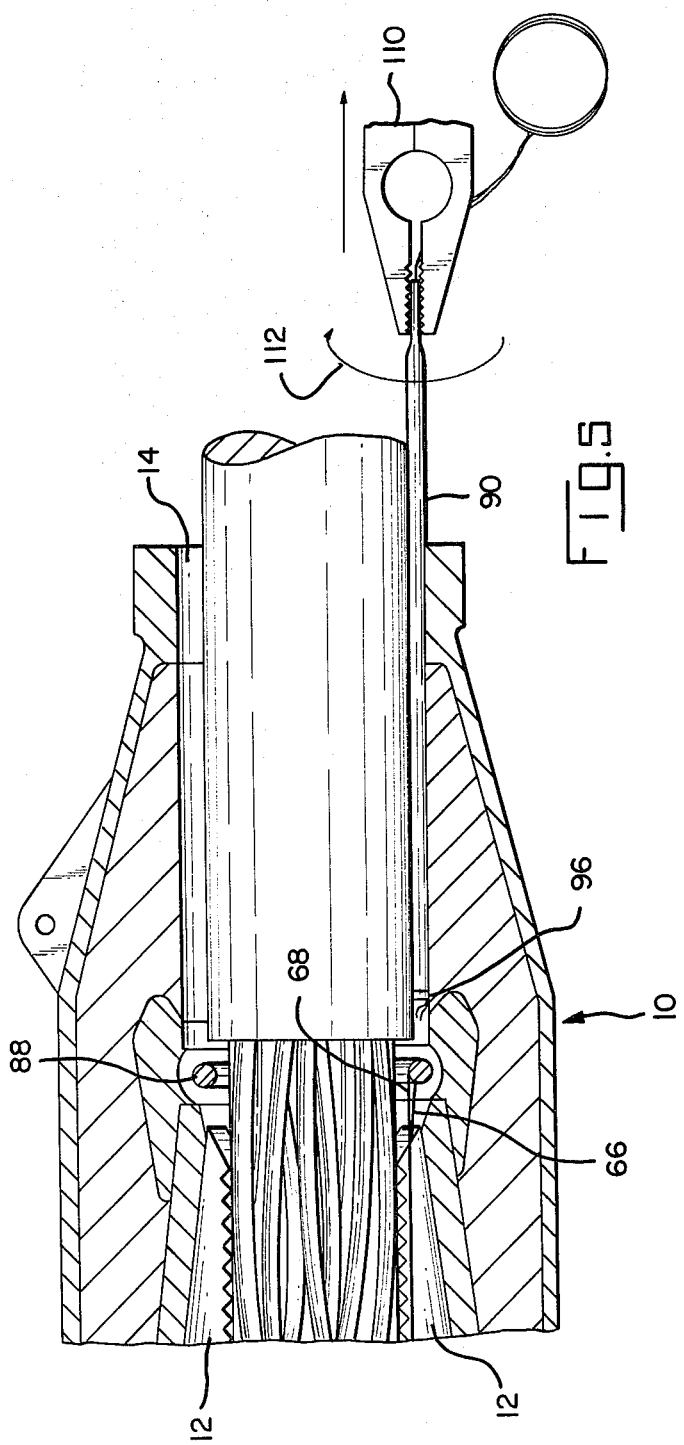

IGNITION SYSTEM FOR AN ELECTRICAL CONNECTOR

BACKGROUND OF THE INVENTION

1. The Field of the Invention

The invention disclosed herein relates to ignition systems used for igniting powder between two cable-gripping jaw members within a tapered shell to splice or connect two high voltage cables together.

2. The Prior Art

U.S. Pat. No. 3,826,860, assigned to the same assignee as is this application, is the most relevant prior art known to me. The internally fired electrical connector therein disclosed, includes an ignitor assembly with the firing circuit utilizing the two cables being connected or spliced together. The present invention represents a novel improvement over the aforementioned ignition system.

SUMMARY OF THE INVENTION

The present invention relates to an improved ignition system which includes an ignitor assembly and a device to remove the electrical detonating wires from the connector after igniting the propellant. The ignitor assembly consists of an outer body containing a primer unit at one end and a contact unit at another end. The contact unit electrically contacts a metal plug in the otherwise insulated primer unit. Current flows through detonating wires into the primer unit where it ignites the powder contained therein.

The aforementioned device consists of a spring clip in the connector and a tube through which extends a wire or cord. A plug is fixed to the wire at one end of the tube so that it can be pulled into that end. The detonating wires, tied to the spring clip, are threaded through the tube as they extend out of the connector and are immobilized or trapped by pulling the plug into the tube. After firing the tube with the wires trapped therein is twisted. The twisting causes the detonating wires to break off at the spring clip. Thereafter the tube and broken wires are withdrawn from the connector.

BRIEF DESCRIPTION OF THE DRAWINGS

FIG. 1 is a cross-sectional view looking into an internally fired electrical connector in which the present invention is utilized;

FIG. 2 is a cross-sectional view of the ignitor assembly constructed in accordance with the preferred embodiment of the present invention;

FIG. 3 is a view of the device, constructed in accordance with the preferred embodiment of the present invention, used in conjunction with the ignitor assembly shown in FIG. 2; and FIGS. 4 and 5 illustrate the use of the device of FIG. 3.

DESCRIPTION OF THE INVENTION

The cross-sectional view in FIG. 1 is of an electrical connector, sometimes referred to in the industry as an internally fired, underground splice. The connector, indicated generally by reference numeral 10, has a pair of cable gripping jaw sets 12 which are driven onto cable ends (FIGS. 4 and 5) inserted into the connector from each end 14. Expanding gases drive pistons 16 and 18 outwardly to drive the jaw sets onto the cable ends. The gases are generated by igniting propellant 20 with ignitor assembly 22. The disclosure of the aforementioned U.S. Pat. No. 3,826,860, may be referred to for a more detailed description regarding the connector.

FIG. 2 is an enlarged cross-sectional view of ignitor assembly 22 which is part of the present invention. The several components thereof include outer body 24, contact unit 26 and primer unit 28.

Outer body 24 is cylindrical and has external threads 30 thereon for mating with piston 18. A passage 32, extending through the body, has a large first section 34 and a small second section 36. The diameter change provides a shoulder 38. Preferably the outer body is made from low carbon steel.

Contact unit 26 includes a T-shaped, inner body 40, retention spring 42, insulative spacer 44 and center post 46.

Body 40 is an elongated cylindrical shaft 48 with a flange 50 on one end. A shoulder 52 is defined by the flange. A collar 54, integral with the shelf is located immediately below the flange. The collar has an outer diameter equal to the inner diameter of section 36 of passage 32 in outer body 24. Further, the collar provides a shoulder 56. Passage 58 extends longitudinally through the inner body. The inner body is preferably made from brass.

Retention spring 42 is cylindrical and has two or more fingers (not shown) which are formed to extend obliquely outwardly. The spring, made from a material such as tin placed beryllium copper, fits around the inner body below collar 54 and retains contact unit 26 in outer body 24 by the fingers pressing out against the walls of section 36 of passage 32.

Insulative spacer 44 is cylindrical and has a flange 60 at one end. A passage 62 extends through the spacer longitudinally. The spacer is preferably made from polyethylene.

Center post 46 is an elongated shaft with a cone-shaped tip 64 at one end which provides a shoulder 65. The post is made from brass.

Assembly of the contact unit is shown in FIG. 2. A bared end of enameled wire 66 is placed into the passage 62 in spacer 44 and trapped therein by pushing center post 46 into the passage. The shoulder 65 on the post abuts against flange 60.

After retention spring 42 is slid onto inner body 40, a bared end of a wire 68 is placed into passage 58 and trapped therein by pushing the sub unit; center post 46/insulative spacer 44, into the passage. As shown, the sub unit enters the inner body at an end opposite flange 50.

Primer unit 28 comprises a plastic tube 70, metal plug 72, a clear plastic sheet 74, a metal, cup-shaped spacer 76 and a short bar wire 78.

Wire 78 is placed in the tube with the ends coming out both ends of the tube. Clear plastic sheet 74 is placed across and secured to one end of the tube. The tube is then filled with powder 80 and metal plug 72 placed in the end opposite plastic sheet 74. One end of wire 78 is trapped between the plug and tube and the excess trimmed off. The metal spacer 76, which has an opening 82 in its base, is now secured to the end of the tube opposite metal plug 72. The other end of wire 78 is trapped between the tube and spacer 76.

In assembling ignitor assembly 22 an insulative washer 84 is placed in the large first section 34 of passage 32 so that it abuts against shoulder 38. Primer unit 28 is placed in the large section 34 and end 86 of outer body 24 is peened over to the position shown in FIG. 2.

This locks primer unit 28 in place. Other means for locking it in may also be used.

The assembled contact unit 26 is now placed into the small, second section 36 of passage 32 so that tip 64 of center post 46 presses metal plug 72 in the primer unit through washer 84. Unit 26 is held in place by the outwardly extending fingers on retention spring 42.

The ignitor assembly 22 is threaded into piston 18 and that unit is then placed into postion 16 and then into connector 10. Wires 66 and 68 extend outwardly towards an end 14. They are secured to spring clip 88 (FIG. 1) by means of a double clove hitch.

Reference is now made to FIG. 3 which illustrates device 90 used with ignitor assembly 22. The device includes a plastic tube 92, wire 94, and a plastic plug 96. One half or so of the plug has an outer diameter such as to fit into passage 98 of tube 92. The remaining part of the plug has a larger diameter to provide a shoulder 100. Further, a passage 102 extends through the plug. A counterbore 104 is provided at one end of the passage. The device is assembled by threading one end of wire 92 through the plug and securing it in the counterbore in any conventional manner. The other end of the wire is passed through tube 90 and made into a ring 106. By pulling the wire, plug 94 can be pulled into tube 92.

FIGS. 4 and 5 illustrate the use of device 90 in conjunction with ignitor assembly 22. The user receives connector 10 as shown in FIG. 1 but with removable end plugs (not shown) positioned in ends 14 of the connector. He also receives device 90 as shown in FIG. 3. He removes the end plugs and threads wires 66 and 68 through tube 92. He slides the tube into the connector up to spring clip 88 and then pulls back on ring 106. This pulls plug 96 into the tube and by so doing, immobilizes wires 66 and 68 between the wall of the tube and the plug. As shown in FIG. 4, cables 108 are inserted into each end of the connector and wires 66 and 68 are attached to an electric detonating device (not shown).

Current flows through wire 66 to center post 46. From there it passes through metal plug 72 and into bared wire 78. Wire 78, made from nichrome, heats up and ignites powder 80. The ignited powder burns through plastic sheet 74 and ignites main propellant 20. The gases generated by the burning of propellant 20 drives pistons 16 and 18 which in turn drive jaw sets 12 onto cables 108.

Thereafter tube 92 of device 90 is gripped with a pair of pliers 110 as shown in FIG. 5, and twisted as indicated by arrow 112. The twisting motion along with the cooperation of the clove hitch, causes the wires to break at the spring clip. Device 90 is then withdrawn from the connector along with the broken-off wires 66 and 68.

The present invention may be subject to many modifications and changes without departing from the spirit or essential characteristics thereof. The present embodiment should therefore be considered in all respects as illustrative and not restrictive of the scope of the invention.

What is claimed is:

1. A device for use with an internally fired electrical connector of the type having detonating wires extending from the ignitor assembly within the connector through one end to the outside, said device comprising:
   a. first means within the connector to which the detonating wires may be secured as they pass out of the connector, such as being tied in the manner of a double clove hitch or the like;
   b. a tube for positioning in the connector with one end adjacent to the first means and the second end extending out of the connector, said tube being adapted for threading the detonating wires therethrough;
   c. second means for immobilizing the detonating wires at the end of the tube adjacent the first means so that after firing, the detonating wires may be broken off at the first means by twisting the tube.

2. The device of claim 1 wherein the second means includes a plug and a wire or the like connected to the plug and extending through the tube so the plug can be pulled into the end of the tube adjacent the first means.

3. The device of claims 1 or 2 further including an ignitor assembly for use within the connector, said assembly comprising:
   a. an outer body having a passage with a large first section and a small second section with the junction therebetween providing a shoulder;
   b. an insulative washer positioned in the passage against said shoulder;
   c. a primer unit consisting of a plastic tube filled with a powder, a nichrome wire extending through the powder and out through both ends of the tube, a plastic sheet covering one end of the tube, a metal plug inserted into the other end of the tube with one end of the nichrome wire in contact therewith and a metal cup with a hole therethrough placed over the opposite end of the tube in contact with the second end of the nichrome wire, said primer unit being positioned in the first section of the passage with the metal plug abutting the washer; and
   d. a contact unit consisting of a metal center post having a tip on one end, an insulative spacer around the center post and a metal inner body having a passage therethrough in which the center post and spacer are positioned, and a first detonating wire extending in between the center post and spacer and a second detonating wire extending in between the spacer and inner body, said unit being positioned in the second section of the passage with the tip on the center post extending through the washer and into contact with the metal plug in the primer unit so that a current passing through the first detonating wire travels through the center post to the nichrome wire via the metal plug and returns to the second detonating wire through the metal cup, outer body and inner body.

* * * * *